(12) United States Patent
Pestke

(10) Patent No.: US 11,052,730 B2
(45) Date of Patent: Jul. 6, 2021

(54) INTERIOR COMPONENT OF A VEHICLE

(71) Applicant: ILLINOIS TOOL WORKS INC., Glenview, IL (US)

(72) Inventor: Joachim Pestke, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 166 days.

(21) Appl. No.: 16/421,740

(22) Filed: May 24, 2019

(65) Prior Publication Data

US 2019/0366806 A1 Dec. 5, 2019

(30) Foreign Application Priority Data

Jun. 4, 2018 (DE) ..................... 10 2018 113 183.6

(51) Int. Cl.
*B60H 1/34* (2006.01)
*B60H 1/00* (2006.01)

(52) U.S. Cl.
CPC ....... *B60H 1/3421* (2013.01); *B60H 1/00564* (2013.01)

(58) Field of Classification Search
USPC ......... 454/152–153, 155, 277–279, 313–314
See application file for complete search history.

(56) References Cited

U.S. PATENT DOCUMENTS 6,685,555 B1 * 2/2004 Davis, Jr. ............. B60H 1/3421
454/155
2016/0227670 A1 * 8/2016 Liu ..................... H05K 7/20181

* cited by examiner

*Primary Examiner* — Vivek K Shirsat
(74) *Attorney, Agent, or Firm* — Thompson Hine LLP

(57) ABSTRACT

An interior component of a vehicle includes a visible component facing the vehicle interior in the mounted state and a functional component connected to the visible component, wherein an axle component is provided on which, on the one hand, the visible component and, on the other hand, the functional component are mounted.

19 Claims, 6 Drawing Sheets

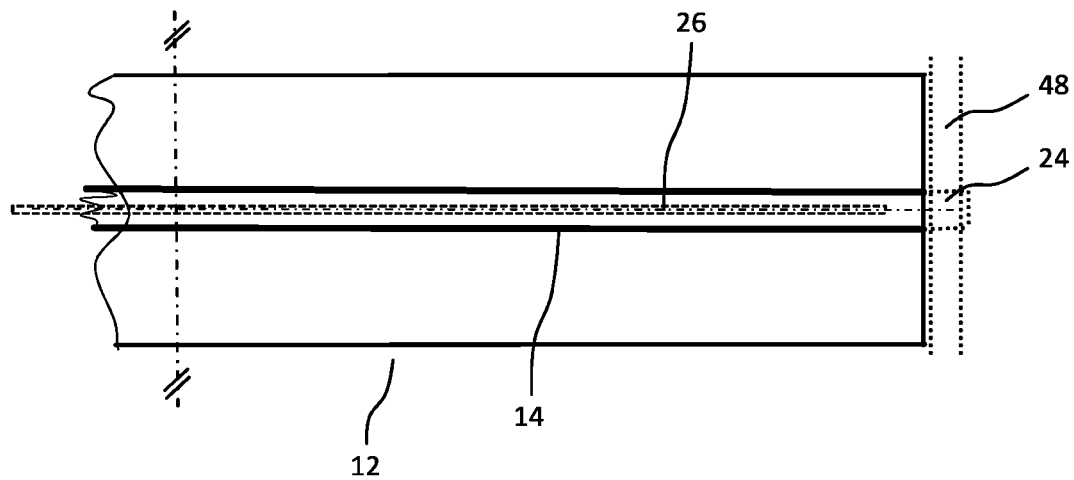
Fig. 23
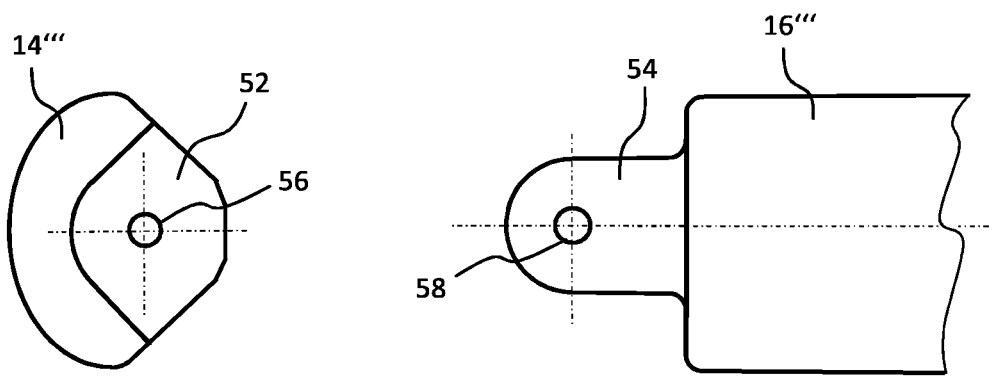
Fig. 24
Fig. 25
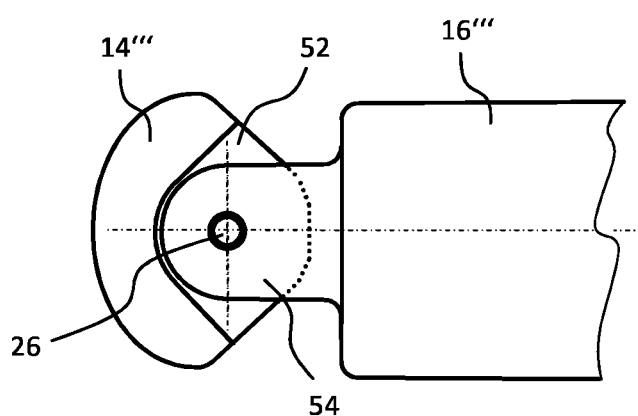
Fig. 26

INTERIOR COMPONENT OF A VEHICLE

TECHNICAL FIELD

The invention relates to an interior component of a vehicle, in particular a passenger car or truck, comprising a visible component facing the vehicle interior in the mounted state and a functional component connected to the visible component.

BACKGROUND

For example, pivotable air-guiding slats are provided in air vents of vehicles. There is sometimes the requirement to mount other components, for example covers, on said air-guiding slats. For this purpose, latching connections having omega-shaped latching hooks are known from the prior art. It is disadvantageous that the installation force is approximately identical to the removal force. There is therefore a conflict of objectives between having a desired removal force which is as high as possible to provide secure holding, on the one hand, and a load desired installation force, on the other hand. For example, required removal forces for a misuse situation may be 150 N. Added to this is the fact that the installation of the known latching connection is difficult. Even during the initial installation, the omega-shaped latching hooks may jam and even break off.

SUMMARY

Taking the explained prior art as the starting point, the invention is based on the object of providing an interior component of the type mentioned at the beginning, in which a connection between a visible component and a functional component can be fitted simply and with low installation forces and at the same time provides high holding forces.

The invention achieves the object by means of the subject matter of independent claim 1. Advantageous refinements are found in the dependent claims, the description and the figures.

For an interior component of the type mentioned at the beginning, the invention achieves the object in that an axle component is provided on which, on the one hand, the visible component and, on the other hand, the functional component are mounted.

The interior component is installed in the interior of a vehicle, such as a passenger car or truck. It is visible to vehicle occupants. In particular, the visible component is visible from the vehicle interior. The visible component can have an elongate form. The functional component can also have an elongate form. The functional component carries out a function. For example, the functional component can carry out an air-guiding function or an operating function or the like. The visible component can be, for example, a cover or an illuminated component, such as a light guide, or a grille element. The functional component can be located in particular behind the visible component, as seen from the vehicle interior. The functional component can be (completely) concealed by the visible component, as seen from the vehicle interior. For example, it is possible for the visible component not to be thicker (for example not higher in the mounted state) than the functional component, in particular for it to have substantially the same thickness or height as the functional component.

According to the invention, an axle component is provided for connecting the visible component and the functional component. The axle component is of elongate design. For example, the axle component can be of cylindrical design. The axle component can also be elastic. A secure and simple connection between the visible component and the functional component is undertaken by the axle component. At the same time, the effect achieved by an axle component is great flexibility in respect of the configuration of the connection, for example pivotable connection/fixed connection, etc. The axle component permits simple installation with low installation forces, high holding forces, in particular higher holding forces than the required installation forces, being able to be realized at the same time in the mounted state. The disadvantages explained with respect to the prior art are overcome. For the installation, it is possible, for example, for first of all one component of the functional component and visible component to be preassembled on the axle component and, for the final installation, for the other component of the functional component and the visible component to then be mounted on the axle component.

As explained, high holding forces can be realized by the connection of the functional component and the visible component via the axle component, and therefore, even in the event of misuse, an undesired removal of the visible component and functional component can be avoided. The axle component here transmits the forces acting on the visible component. It is possible for removal not to be possible without additional tools. The high holding forces can in principle be present in all directions, but in particular in respect of a tensile force for releasing the visible component from the functional component. At the same time, the connection according to the invention by the axle component requires only little construction space, which is of great importance in particular in the case of air-guiding slats and their covers.

Of course, the interior component according to the invention can also be provided with a plurality of visible components and/or a plurality of functional components which are connected to one another via a plurality of axle components in the manner according to the invention.

The axle component can in particular form the single direct connection between the visible component and the functional component. It is also possible for the functional component and/or the visible component to in each case also be connected to another part of the interior component, for example to a housing. As explained, the axle component can be composed of an elastic material. This further facilitates the installation and at the same time provides a secure support. This is of advantage for the installation in particular where the available construction space is small. In addition, possible component tolerances can also be compensated for by an elastic axle component. This is particularly important if a plurality of axle components are provided in the interior component in order to connect a plurality of function components and visible components to one another.

According to a particularly preferred refinement, the functional component can be pivotably mounted, wherein the visible component and the functional component are mounted on the axle component in such a way that the visible component is not concomitantly pivoted during the pivoting movement of the functional component. In this refinement, the functional component is pivotable mounted, for example, on a housing part. Pivoting makes it possible to carry out a function, for example guiding an airflow in a desired direction. The axle component, in particular its longitudinal axis, then forms a pivot axis between the pivotably mounted functional component and the stationary visible component. It can thereby be ensured that the visible component is not concomitantly moved during pivoting of the functional component, i.e. is stationary, and its position and orientation do not change during a pivoting movement of the functional component. This is frequently desirable for visual reasons.

According to a further refinement, it can be provided that the visible component has at least one hook and at least one counter-bearing, wherein the at least one hook and the at least one counter-bearing are in engagement with the axle component from opposite sides, and wherein the at least one hook and the at least one counter-bearing are offset with respect to one another in the axial direction of the axle component. According to a further refinement, it can be provided that the functional component has at least one hook and at least one counter-bearing, wherein the at least one hook and the at least one counter-bearing are in engagement with the axle component from opposite sides, and wherein the at least one hook and the at least one counter-bearing are offset with respect to one another in the axial direction of the axial component.

The refinement with hook and counter-bearing permits simple and reliable installation, with a particularly secure support against unintentional release being achieved at the same time. The effect in particular achieved in this way is that removal is possible only with an appropriate tool. The holding forces can be increased further. Automatic release can be prevented. The axial direction is the longitudinal direction of the axle component here. The hooks can, for example, bound a receptacle in which the axle component is accommodated and is thus held in a first direction. The counter-bearings acting from the opposite side then holds the axle component in a second direction opposed to the first direction. The first and second direction run in particular perpendicularly to the axial direction of the axle component. The visible component and the functional component are thereby securely held on the axle component. Since the hooks and counter-bearings are each offset with respect to one another in the axial direction, within the course of the installation in particular an elastic axle component can simply be inserted into the hooks and counter-bearings by temporary elastic deformation, in particular serpentine deformation. For a secure support, it is possible, for example, for the visible component to have at least two hooks and at least one counter-bearing or at least one hook and at least two counter-bearings. In a corresponding manner, it is possible for the functional component to have at least two hooks and at least one counter-bearing or at least one hook and at least two counter-bearings. However, greater numbers of hooks and counter-bearings can also be provided, for example depending on the length of the visible component and/or functional component.

The hooks of the functional component and the hooks of the visible component can be in engagement with the axle component from opposite sides. The same is then true for the counter-bearings. A connection which is further secured is thereby realized. However, it is also possible for the hooks of the functional component and the hooks of the visible component to be in engagement with the axle component from the same side. The same is then true in turn for the counter-bearings.

According to a further refinement, the hooks of the functional component and the hooks of the visible component can be arranged directly adjacent to one another, and/or the counter-bearings of the functional component and the counter-bearings of the visible component can be arranged directly adjacent to one another. A particularly secure support against a tensile force acting on the visible component, for example in the event of misuse, is thereby achieved. In this refinement, when a tensile force is exerted, the axle component is thus subjected to a greater shearing stress than bending stress.

In the aforementioned refinement with hooks and counter-bearings, the axle component is inserted as a separate component into the functional component and the visible component. The installation sequence here is basically as desired. For example, the axle component can first of all be inserted into the visible component and subsequently into the functional component, or vice versa. As an alternative to the aforementioned holding via hooks and counter-bearings, it is also possible according to the invention, however, for the axle component, for example, to already be integrated into the functional component or the visible component during the production process of the functional component or of the visible component. For example, the axle component can be injection molded into the visible component or the functional component, in particular can be insert molded as a metal insert with plastic. The preassembly on one component of the functional component or visible component can then already take place during an automated production, and therefore subsequently, for the final installation, only the respectively other component of functional component and visible component still has to be arranged on the axle component.

A further alternative refinement for the installation of the functional component and the visible component on the axle component makes provision for the visible component and/or the functional component to have at least one holding portion with at least one (closed or semi-open) eye, wherein the axle component is inserted into the at least one eye. In this refinement, the axle component can be pushed laterally into the eye(s) for the installation. The functional component and/or the visible component here can have a plurality of eyes as bearing points, into which the axle component is introduced in succession. In this refinement, it is possible, for example, to first of all bring the eyes of functional component and visible component into overlap with one another and to subsequently push the axle component laterally into the eyes.

The functional component and/or the visible component can be composed of a plastic. The visible component and the functional component can be composed of the same material or of different materials. For example, the visible component can be composed of an unreinforced plastic and the functional component of a reinforced plastic, for example a glass fiber reinforced plastic. According to a particularly practical refinement, the axle component can be formed by a metal wire. Metal wires as axle components provide a very good spring action and at the same time a secure mounting. The metal used can be, for example, spring steel. Metal at the same time has sufficient heat stability, and therefore, for example in the event of use in an air vent which is exposed to a wide temperature range in accordance with the air temperature, optimum mounting always takes place.

In addition, metal is a good friction partner with plastic as may be used for the visible component and the functional component. Since the axle component transmits the forces acting on the visible component, for example in the event of misuse, the holding force is increased further by the use of a metal material.

According to a further particularly practical refinement, the interior component can be an air vent of a vehicle, wherein the visible component is a cover or a grille element or a light guide of the air vent. For example, a central web of a cover can be mounted on the axle component. Such a central web of the cover or the cover can be connected integrally to a cover frame or to the housing of the air vent or conform a separate part. According to the invention, a plurality of such visible components can also be combined in any desired manner. The cover and the housing of the air vent can be composed here of the same material, for example the same plastic, or of different materials, for example different plastics.

According to a further refinement in this regard, the functional component can be an air-guiding element, in particular an air-guiding slat, of the air vent. Air-guiding slats are pivoted in order to deflect the airflow, wherein decorative visible components are frequently provided on the front edge of the air-guiding slats facing the vehicle interior, with the intention being that the visible components, if possible, do not change their position and orientation during the pivoting of the air-guiding slat. At the same time, because of the small thickness of air-guiding slats and the correspondingly generally small thickness of the visible components provided at the front edges thereof, only a small construction space is available for the connection between the air-guiding slat and the visible component. Both requirements can be optimally met by the invention. However, of course, other components, for example operating elements or the like, are also conceivable as functional components.

The air-guiding element can have opposite pivot pins by means of which the air-guiding element is pivotably mounted on a housing of the air vent. Said pivot pins can be provided as an end-side extension of the axle component on the main slat body. In principle, a pivotable mounting of the air-guiding slats without such pivot pins is also conceivable by the pivot mounting being realized directly via the axle component by the axle component engaging, for example, in corresponding pivoting receptacles of the housing of the air vent.

In principle, a very wide variety of combinations of functional components and visible components is conceivable with the connection according to the invention of the visible component and functional component by means of an axle component. The connection of two fixed components, for example a decorative element with a cover or a light guide with a cover, or a decorative element with a housing, or a grille with a housing-side web, will be explained merely by way of example. The visible component should then in each case be considered to be the component which faces the vehicle interior and as a rule carries out a decorative function. The functional component should then in each case be considered to be the component which is connected to the visible component in the manner according to the invention. In this case, for example, a cover can also be a functional component by said cover, as the function, having a cover function, or a housing which, as the function, has, for example, the provision of a flow duct of an air vent. Furthermore, the connection of two movable, in particular pivotable, functional components and of a fixed visible component, for example the arrangement of two pivotable air-guiding slats behind a fixed cover, is mentioned merely by way of example. Furthermore, the combination of two fixed visible components and one or more movable, in particular pivotable functional components, for example the connection of a decorative component and/or of a light guide to a cover and at the same time a connection of the cover to one or more pivotable air-guiding slats or, for example, the connection of a grille to a pivotable air-guiding slat, is mentioned merely by way of example.

If a cover is present as one of the components, the configuration of said cover is likewise basically as desired. For example, one such cover can have an encircling or partial cover frame with a free flow cross section or with a grille structure in the flow cross section. Such a grille structure can be integrated, for example, into a plastics cover frame or, as a separate part, can be composed of other materials, for example metal. In this case, for example, an air-guiding slat can support the high forces acting on the grille structure in the event of misuse via the axle component and can thus avoid failure or breaking of the grille. As likewise already explained, such a cover can also contain, for example, one or more light guides. The light guide or the light guides can alternatively or additionally be connected to the cover or to a housing in the manner according to the invention via the axle component.

The axle component can be arranged concentrically to the pivot pins in order to permit as frictionless pivoting as possible. However, it is also possible for the axle component to be arranged (slightly) eccentrically with respect to the pivot pins. In principle, the aforementioned refinement can result in what is referred to as an axle-in-axle system by the pivot pins substantially forming an end-side extension of the axle component. A slight eccentricity between the axle component and the pivot pins may occur here consciously or else because of unavoidable component tolerances. Such a slight eccentricity produces a prestress which avoids a formation of noise, such as rattling, in an advantageous manner, but without noticeably increasing the operating forces. Thus, over the course of the installation, a slight bracing between the visible component and the air-guiding slat and also of the housing pivotably mounting the air-guiding slat occurs, as a result of which, in turn, a damping action on the pivoting movement is achieved. In this respect, the good friction pairing between metal and plastic is of particular advantage.

According to a further refinement, holding means can be provided which hold the functional component in at least one pivoted position. The holding means can comprise, for example, latching means and/or friction means which hold the functional component in the at least one pivoted position by latching and/or frictional force. The holding means hold the functional component, for example an air-guiding slat, in one or more pivoted positions, for example in all of the pivoted positions, against automatic adjustment, for example due to the action of gravity and/or action of an airflow flowing through an air vent equipped with the air-guiding slat. The friction means can be formed, for example, by the explained eccentric orientation between the axle component and pivot pins of the air-guiding slat. Alternatively or additionally, latching means can be provided which latch into place in certain pivoted positions and thus predetermine certain pivoted positions. In general, an inadvertent adjustment of the functional component is avoided by the holding means. Examples of suitable latching means are interacting grooves and ribs of parts moving relative to one another during the pivoting movement, for example between the visible component and the functional component or between the functional component and a housing of the air vent. The axle component itself can also be specially adapted in this respect, for example can have a geometry which is angled or curved in some other way and provides a corresponding friction force. For this purpose, it may be required to connect the axle component to one of the interconnected components for rotation therewith.

BRIEF DESCRIPTION OF THE DRAWINGS

Exemplary embodiments of the invention will be explained in more detail below with reference to figures, in which, schematically:

FIG. 23 shows a schematic, partially sectioned illustration of the air-guiding slat and cover in the state mounted on a housing of the air vent, FIG. 24 shows a cover in a side view corresponding to FIG. 4 according to a further exemplary embodiment, FIG. 25 shows an air-guiding slat in a side view corresponding to FIG. 9 according to a further exemplary embodiment, and FIG. 26 shows the cover from FIG. 24 and the air-guiding slat from FIG. 25 in a state mounted on an axle component.

Unless stated otherwise, the same reference signs denote the same objects in the figures.

DETAILED DESCRIPTION

Figure 1:
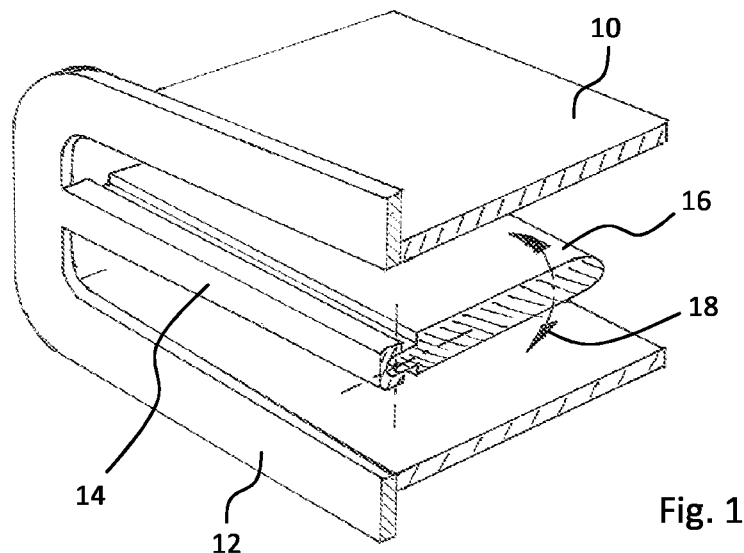
FIG. 1 shows an air vent according to the invention in a partially sectioned, perspective view.
Figure 2:
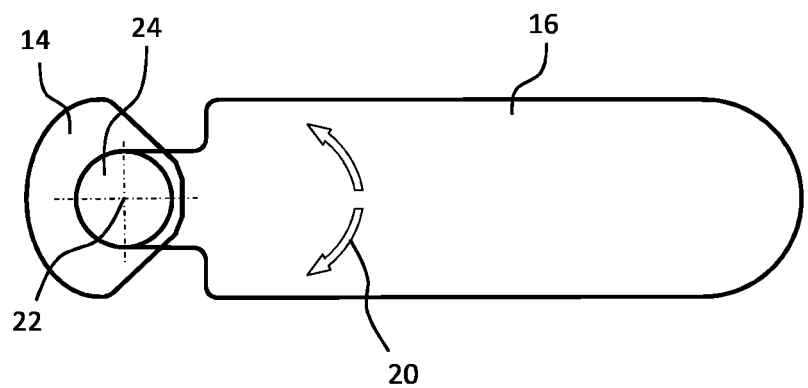
FIG. 2 shows a schematic enlargement of an air-guiding slat of the air vent shown in FIG. 1 having a cover, in a partially transparent side view.

The air vent which is illustrated in extremely schematic form in FIG. 1 has a housing 10 with a cover frame 12 and a cover 14 forming a central web of the cover frame 12. An air-guiding slat 16 is mounted pivotably in the flow duct formed by the housing 10, as shown by the arrow 18. Air flowing through the flow duct can thus be deflected in a desired manner into the vehicle interior. This is known per se and therefore will not be explained in more detail. The air-guiding slat 16 is pivotably connected to the cover 14, as shown by the arrows 20 in FIG. 2. The pivot axis can be seen at reference sign 22. In addition, it can be seen that, in the example illustrated, the air-guiding slat 16 has bearing pins on opposite sides in the region of the pivot axis 22, of which bearing pins 1 can be seen in FIG. 2 at reference sign 24. The air-guiding slat 16 is accommodated in corresponding bearing receptacles of the housing 10 via said bearing pins 24 for the pivotable mounting. This is also known per se.

Figure 3:
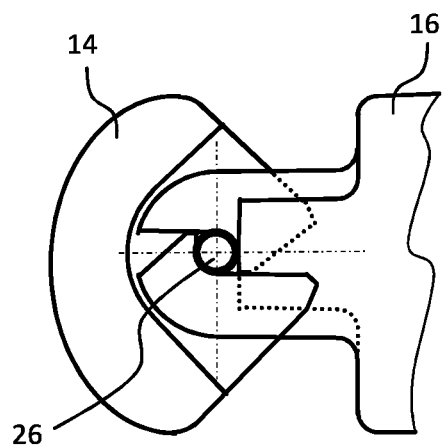
FIG. 3 shows a partial sectional illustration of the view from FIG. 2.

It can be seen in the highly schematic, sectioned and partially transparent illustration of FIG. 3 that the cover 14 and the air-guiding slat 16 are each mounted on a cylindrical axle component 26 which is elongate in the example illustrated. In the example illustrated, the axle component 26 is formed by a metal wire, preferably a spring steel wire. By contrast, the cover 14 and the slat 16 can be composed, for example, of plastic. The connection provided by the axle component 26 is in such a manner that the cover 14 is not concomitantly pivoted during a pivoting movement of the air-guiding slat 16, but rather does not change its position and orientation.

Figure 4:
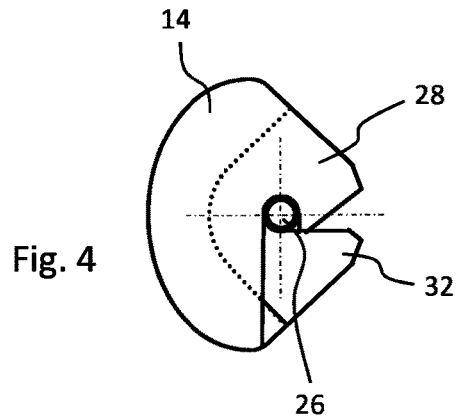
FIG. 4 shows a side view of the cover shown in FIG. 3 having an axle component mounted therein.
Figure 5:
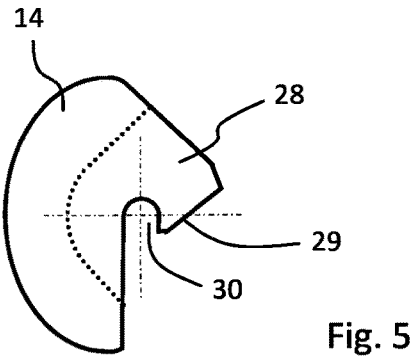
FIG. 5 shows an illustration of a hook of the cover.
Figure 6:
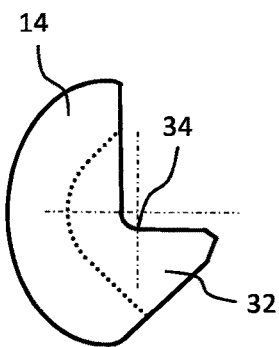
FIG. 6 shows an illustration of a counter-bearing of the cover according to one exemplary embodiment.
Figure 7:
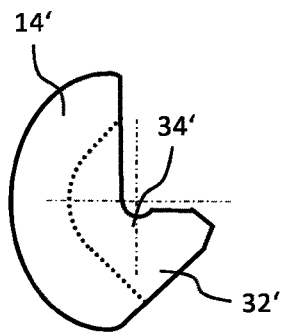
FIG. 7 shows an illustration of a counter-bearing of the cover according to a further exemplary embodiment.
Figure 8:
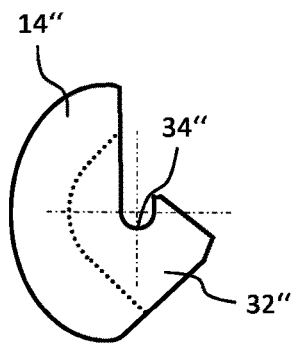
FIG. 8 shows an illustration of a counter-bearing of the cover according to a further exemplary embodiment.
Figure 15:
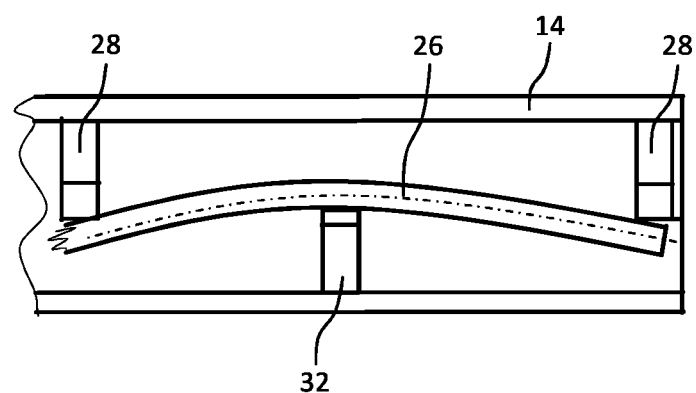
FIG. 15 shows a schematic partial rear view of the cover shown in FIG. 3, in a preassembly position.

The connection provided by the axle component 26 will be explained in more detail with regard to an exemplary embodiment with reference to FIGS. 4 to 18. As can be seen in FIGS. 4 and 5 and also 15 and 16, the cover 14 has a plurality of hooks 28 which are distributed along its longitudinal direction and each form a receptacle 30 for the axle component. As can furthermore be seen in FIGS. 4 and 6 and also 15 and 16, in the example illustrated the cover 14 furthermore has a plurality of counter-bearings 32 which are likewise arranged distributed along its longitudinal direction and each form a counter-bearing surface 34 for the axle component 26. FIGS. 7 and 8 illustrate further exemplary embodiments of such counter-bearings 32' and 32" for covers 14' and 14", said counter-bearings each forming a counter-bearing surface 34' and 34" in the form of a receptacle for the axle component 26. The function will be described below only for the counter-bearing 32 according to FIG. 6. The function of the counter-bearings 32' and 32" is to this extent corresponding. It should be pointed out that, for illustrative reasons, only one hook is illustrated in FIG. 5 and only one counter-bearing in FIGS. 6 to 8. As can be seen, for example, in FIG. 4, in the mounted state the hooks 28 and the counter-bearings 32 are in engagement with the axle component 26 from opposite sides, wherein said hooks and counter-bearings are correspondingly offset with respect to one another in the axial direction of the axle component 26. The elastic axle component 26 can thereby be inserted into the hooks 28 and counter-bearings 32 for installation, as is shown in FIG. 15, in order to reach a position preassembled on the cover 14, as per FIG. 16.

Figure 9:
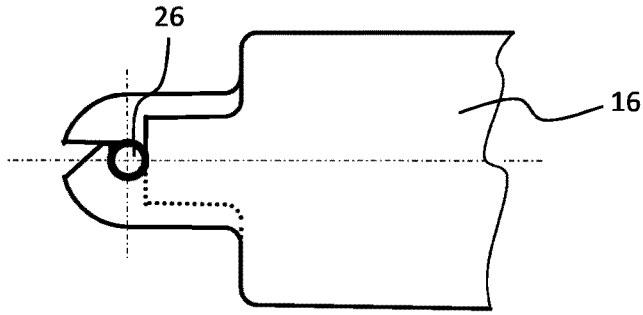
FIG. 9 shows a partial side view of the air-guiding slat shown in FIG. 3 having an axle component mounted therein.
Figure 10:
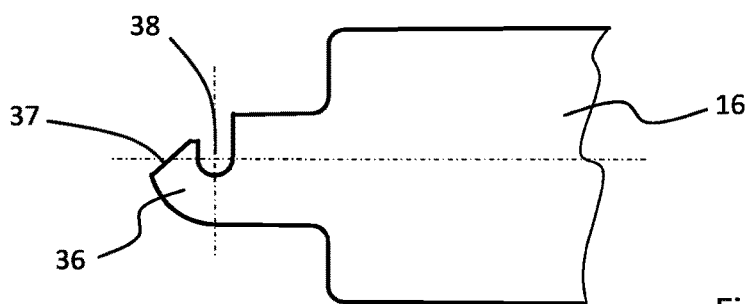
FIG. 10 shows an illustration of a hook of the air-guiding slat.
Figure 11:
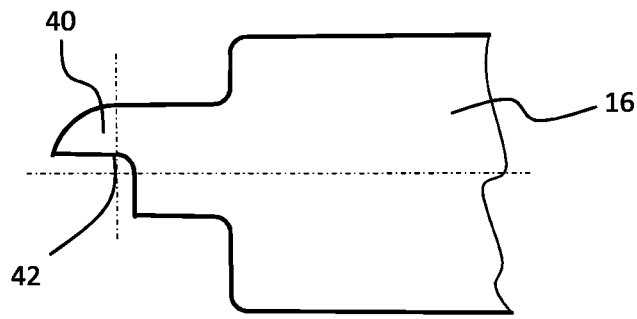
FIG. 11 shows an illustration of a counter-bearing of the air-guiding slat according to one exemplary embodiment.
Figure 12:
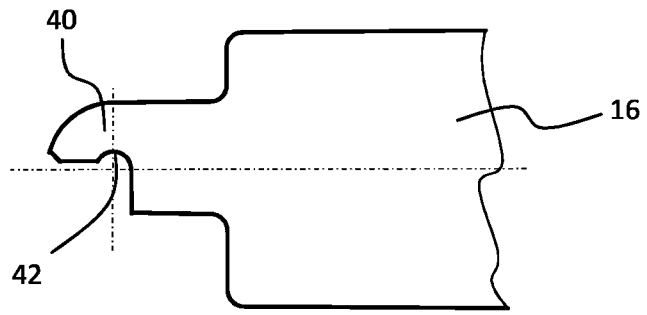
FIG. 12 shows an illustration of a counter-bearing of the air-guiding slat according to a further exemplary embodiment.
Figure 13:
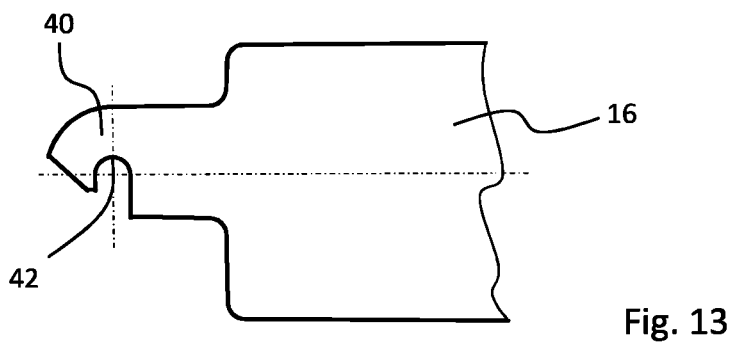
FIG. 13 shows an illustration of a counter-bearing of the air-guiding slat according to a further exemplary embodiment.
Figure 14:
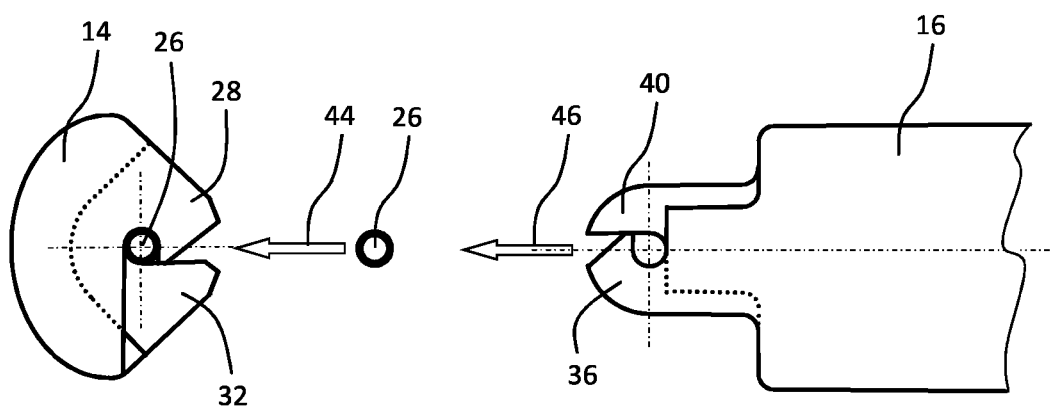
FIG. 14 shows a further illustration of the cover and of the air-guiding slat to show the installation.
Figure 16:
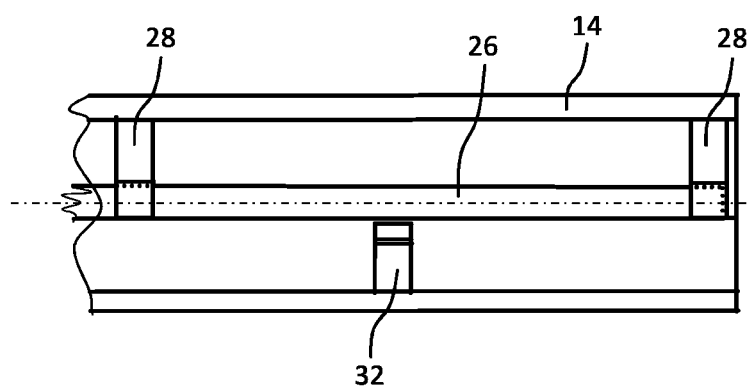
FIG. 16 shows the illustration from FIG. 15 in a further preassembly position.
Figure 17:
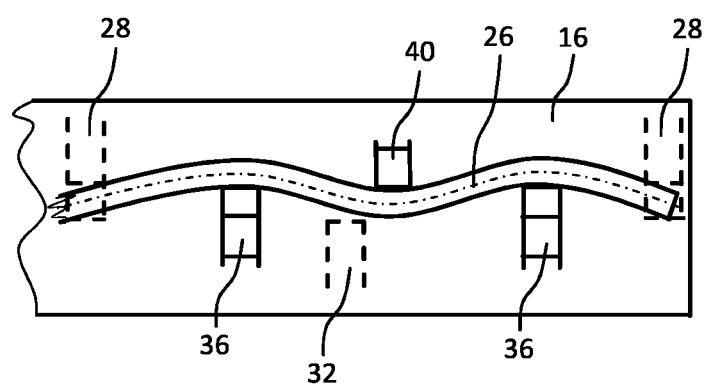
FIG. 17 shows a partial front view of the air-guiding slat shown in FIG. 2 having hooks (shown by dashed lines) and counter-bearings of the cover, in a further installation state.
Figure 18:
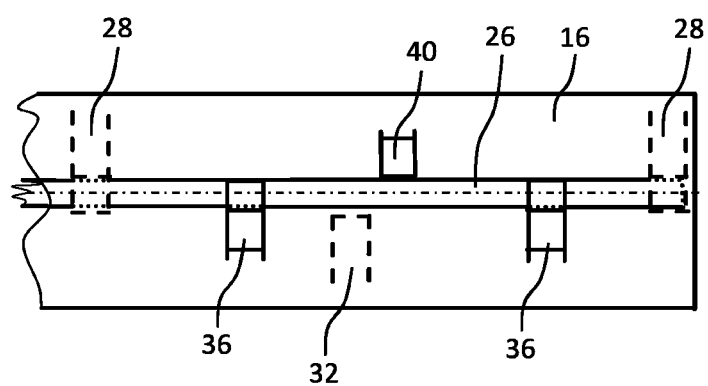
FIG. 18 shows the view from FIG. 17 in a final installation state.

The again highly schematic view of FIG. 9 illustrates how the air-guiding slat 16 is in engagement with the axial component 26. For this purpose, the air-guiding slat 16 also has hooks and counter-bearings which are in engagement with the axle component 26 from opposite sides. Such a hook 36 of the air-guiding slat 16 can be seen in FIG. 10. It in turn forms a receptacle 38 for the axle component 26. In FIG. 11, a counter-bearing 40 of the air-guiding slat 16, which counter-bearing is in engagement with the axle component 26 from the opposite side, can be seen. Said counter-bearing in turn forms a counter-bearing surface 42 for the axle component 26. FIGS. 12 and 13 illustrate further exemplary embodiments of such a counter-bearing 40', 40"

for air-guiding slats 16' and 16", said counter-bearing in turn constitutes counter-bearing surfaces 42' and 42" in the form of receptacles for the axle component 26. The function will again be described below only for the counter-bearings 40 according to FIG. 11. The function of the counter bearings 40' and 40" is to this extent corresponding. It should then be pointed out that, for illustrative reasons, FIGS. 10 to 13 each show only one hook or only the counter-bearings of the air-guiding slat 16. As can be seen in FIGS. 17 and 18, the air-guiding slat 16 in turn has a plurality of hooks 36 and counter-bearings 40 distributed in its longitudinal direction. For illustrative reasons, the hooks 28 and counter-bearings 32 of the cover 14 are shown by dashed lines in FIGS. 17 and 18. It can in turn be seen from FIGS. 17 and 18 that the hooks 36 and counter-bearings 40 are in engagement with the axle component 26 from opposite sides. As shown by the arrow 44 in FIG. 14, for the installation, the axle component 26 can be inserted, for example, first of all into the cover 14, as shown in FIGS. 15 and 16. As shown by the arrow 46 in FIG. 14, the air-guiding slats 16 can subsequently be mounted on the axle component 26 in the cover 14. This installation is shown in FIGS. 17 and 18. It can be seen that the elastic axle component 26 can in turn be inserted between the hooks 36 and counter-bearings 40, as shown in FIG. 17, in order to reach the final installation position according to FIG. 18, in which the cover 14 and the air-guiding slat 16 are connected to each other via the axle component 26 in the manner explained above.

Figure 19:
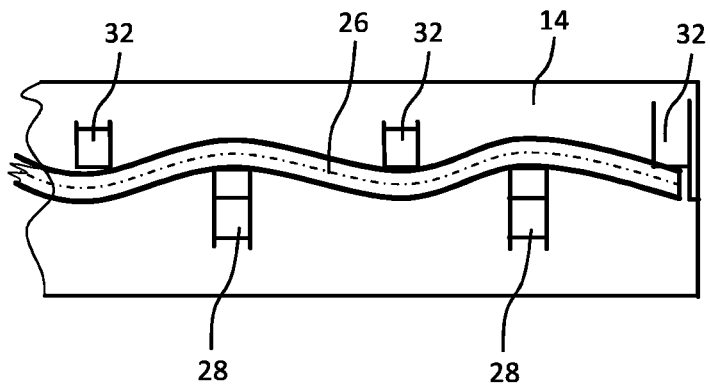
FIG. 19 shows a view corresponding to FIG. 15 according to a further exemplary embodiment.
Figure 20:
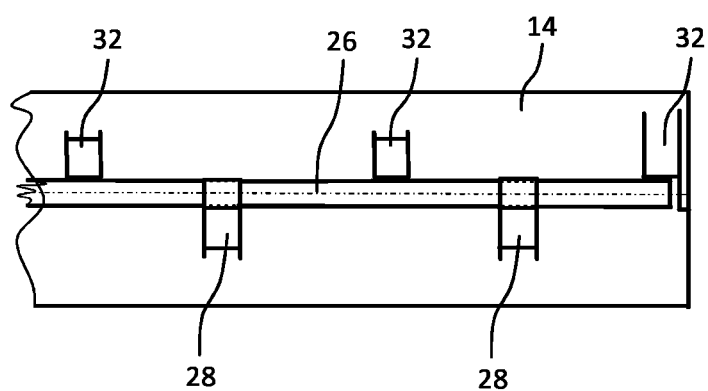
FIG. 20 shows an illustration corresponding to FIG. 16 according to the further exemplary embodiment.

FIGS. 19 to 22 show a further exemplary embodiment for the arrangement of the hooks and counter-bearings of the cover and air-guiding slat, wherein the illustrations of FIGS. 19 to 22 correspond to the illustrations of FIGS. 15 to 18. It can be seen, firstly, that, in this case, the cover 14 has more hooks 28 and counter-bearings 32 arranged distributed along its longitudinal direction. Correspondingly, the axle component 26 when preassembled on the cover 14, as shown in FIG. 19, is elastically bent to a greater extent. In addition, it can be seen that, in this example, the hooks 28 of the cover 14 are in engagement from below, and the counter-bearings 32 of the cover 14 from above, with the axle component 26, i.e. in the reverse direction than shown in FIGS. 15 and 16.

Figure 21:
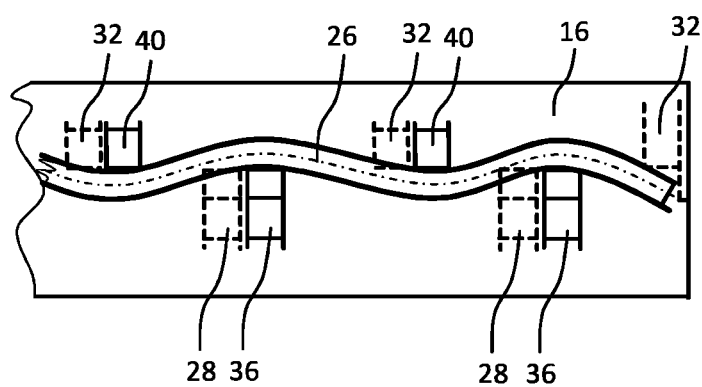
FIG. 21 shows an illustration corresponding to FIG. 17 according to the further exemplary embodiment.
Figure 22:
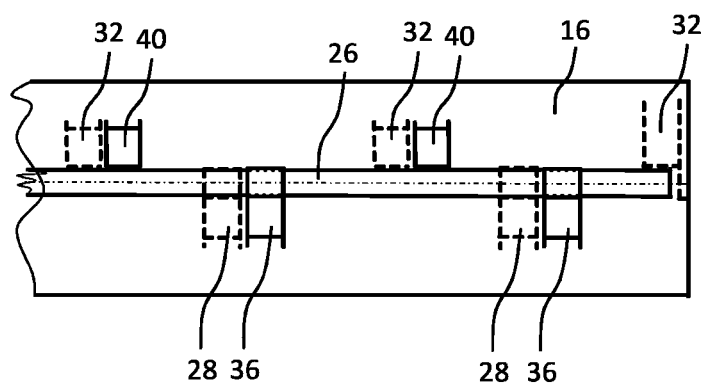
FIG. 22 shows an illustration corresponding to FIG. 18 according to the further exemplary embodiment.

It can furthermore be seen in FIGS. 21 and 22 that the air-guiding slat 16 also has a greater number of hooks 36 and counter-bearings 40 arranged distributed along its longitudinal extent. FIGS. 21 and 22 again illustrate the hooks 28 and counter-bearings 32 of the cover by dashed lines for illustrative purposes. However, in the exemplary embodiment according to FIGS. 21 and 22, the hooks 36 and counter-bearings 40 of the air-guiding slat 16 engage in the axle component 26 from the same side, as in the exemplary embodiment according to FIGS. 17 and 18. Again, for the installation of the air-guiding slat 16 on the axle component 26, which is already preassembled on the cover 14, the axle component 26 can again be inserted between the hooks 36 and counter-bearings 40 by elastic deformation, as shown in FIG. 21, in order to reach the final installation position according to FIG. 22. Owing to the shortened span between the hooks 36, a smaller spring action arises in the event of loading, in particular in the event of a tensile force for pulling the cover 14 off the air-guiding slat 16. The axle component 26 is therefore deformed less, if at all, under pulling-off loading, and a higher holding force is produced.

Whereas, in the exemplary embodiment according to FIGS. 15 to 18, the hooks 28 of the cover 14 and the hooks 36 of the air-guiding slat 16, and therefore also the counter-bearings 32 of the cover 14 and the counter-bearings 40 of the air-guiding slat 16 are each in engagement with the axle component 26 from opposite sides, in the exemplary embodiment according to FIGS. 19 to 22, by contrast, the hooks 28, 36 of the cover 14 and air-guiding slat 16 are in engagement with the axle component 26 from the same side. The same is true of the counter-bearings 32, 40 of the cover 14 and air-guiding slat 16. In addition, it can be seen, in particular of FIGS. 21 and 22, that the hooks 28, 36 of the slat cover 14 and air-guiding slat 16 are each arranged directly adjacent in pairs, and that the counter-bearings 32, 40 of the cover 14 and air-guiding slat 16 are each arranged in pairs directly next to one another. Whilst the exemplary embodiment according to FIGS. 15 to 18 is distinguished by particularly low installation forces, the exemplary embodiment according to FIGS. 19 to 22 provides particularly high holding forces.

In the arrangement shown in the figures, the longitudinal axis of the axle component 26 lies transversely with respect to the installation direction. In this configuration, a spring of sufficient length with a sufficient "resilient length" can be realized in the highly limited connection space between the cover 14 and the air-guiding slat 16. Excessive material stresses are thereby reliably avoided. Particularly in the case of galvanized covers and/or galvanized air-guiding slats, the production of stress cracks due to the rigid, non-resilient plastics connecting geometries (hooks and counter-bearings) is reliably avoided during the installation process. In addition, the hooks 28 and 36 respectively have an installation ramp 29 and 37 which reliably controls the bending of the axle component 26 during the installation. Destruction-free release of the axle component 26 from the fully mounted position is no longer possible because of the vertical blocking surfaces of the hooks 28, 36. Of course, the arrangement of hooks and counter-bearings is also possible in each case in the reverse manner than illustrated in the figures.

FIG. 23 in turn shows in highly schematic form the pivoting mount of the air-guiding slat 16, which is concealed by the cover 14 in FIG. 23, on the housing 10 of the air vent. A wall 48 of the housing 10 is shown by dotted lines. The bearing pins 24 behind the cover 14 and the wall 48 of the housing 10 behind the cover 14 are partially illustrated transparently. The cover frame of the housing 10 can be seen schematically at reference sign 12. The axle component 26 connecting the cover 14 and the air-guiding slat 16, which is substantially concealed in FIG. 23, is likewise illustrated by dashed lines in FIG. 23. Furthermore illustrated by dotted lines in FIG. 23 is one of the two end-side bearing pins 24 which are provided on opposite sides and with which the air-guiding slat 16 is accommodated pivotably in corresponding bearing receptacles of the housing wall 48. The pivot axis, which is formed by the longitudinal axis of the axle component 26, between the cover 14 and air-guiding slat 16 is substantially concentric here with respect to the pivot axis, which is formed by the bearing pins 24, of the air-guiding slat 16 on the housing 10. A slight eccentricity can be present and can advantageously have a damping effect on the pivoting movement of the air-guiding slat 16. As a result, for example, automatic holding of the air-guiding slat 16 in any pivoted positions can be achieved.

FIGS. 24 to 26 show further exemplary embodiments of a cover 14''' and air-guiding slats 16'''. These differ from the above-explained covers 14, 14' and 14" and air-guiding slats 16, 16', 16" in that, instead of hooks and counter-bearings, they have a plurality of holding portions 52, 54 having a respective eye 56, 58. As can be seen in FIG. 26, the axle component 26 is pushed from the side into the eyes 56, 58 after the eyes 56 of the cover 14 and the eyes 58 of the air-guiding slat 16 have been brought into overlap with one another. The cover 14''' and the air-guiding slat 16''' can each have a plurality of such holding portions 52, 54 which are arranged spaced apart in the longitudinal direction and have eyes 56, 58.

LIST OF REFERENCE SIGNS

10 Housing
12 Cover frame
14 Cover
14' Cover
14'' Cover
14''' Cover
16 Air-guiding slat
16' Air-guiding slat
16'' Air-guiding slat
16''' Air-guiding slat
18 Arrow
20 Arrows
22 Pivot axis
24 Bearing pin
26 Axle component
28 Hook
30 Receptacle
32 Counter-bearing
32' Counter-bearing
32'' Counter-bearing
34 Counter-bearing surface
34' Counter-bearing surface
34'' Counter-bearing surface
36 Hook
38 Receptacle
40 Counter-bearing
40' Counter-bearing
40'' Counter-bearing
42 Counter-bearing surface
42' Counter-bearing surface
42'' Counter-bearing surface
44 Arrow
46 Arrow
48 Wall
52 Holding portions
54 Holding portions
56 Eye
58 Eye

What is claimed is:

1. An interior component of a vehicle, comprising a visible component facing the vehicle interior in the mounted state and a functional component connected to the visible component, wherein an axle component (26) is provided on which, on the one hand, the visible component and, on the other hand, the functional component are mounted, wherein the functional component has at least one hook (36) and at least one counter-bearing (40, 40', 40''), wherein the at least one hook (36) and the at least one counter-bearing (40, 40', 40'') are in engagement with the axle component (26) from opposite sides, and wherein the at least one hook (36) and the at least one counter-bearing (40, 40', 40'') are offset with respect to one another in an axial direction of the axle component (26).

2. The interior component as claimed in claim 1, wherein the functional component is pivotably mounted, wherein the visible component and the functional component are mounted on the axle component (26) in such a way that the visible component is not concomitantly pivoted during a pivoting movement of the functional component.

3. The interior component as claimed in claim 1, wherein the visible component has at least one hook (28) and at least one counter-bearing (32, 32', 32''), wherein the at least one hook (28) and the at least one counter-bearing (32, 32', 32'') are in engagement with the axle component (26) from opposite sides, and wherein the at least one hook (28) and the at least one counter-bearing (32, 32', 32'') are offset with respect to one another in the axial direction of the axle component (26).

4. The interior component as claimed in claim 3, wherein the at least one hook (36) of the functional component and the at least one hook (28) of the visible component are in engagement with the axle component (26) from opposite sides.

5. The interior component as claimed in claim 3, wherein the at least one hook (36) of the functional component and the at least one hook (28) of the visible component are in engagement with the axle component (26) from the same side.

6. The interior component as claimed in claim 5, wherein the at least one hook (36) of the functional component and the at least one hook (28) of the visible component are arranged directly adjacent to one another, and/or wherein the counter-bearings (40, 40', 40'') of the functional component and the counter-bearings (32, 32', 32'') of the visible component are arranged directly adjacent to one another.

7. The interior component as claimed in claim 1, wherein the axle component (26) is injection molded into the visible component or the functional component.

8. The interior component as claimed in claim 1, wherein the visible component and/or the functional component have/has at least one holding portion (52, 54) with at least one eye (56, 58), wherein the axle component (26) is inserted into the at least one eye (56, 58).

9. The interior component as claimed in claim 1, wherein the axle component (26) is formed by a metal wire.

10. The interior component as claimed in claim 1, wherein the functional component consists of a plastic and/or the visible component consists of a plastic.

11. The interior component as claimed in claim 1, wherein the interior component is an air vent of a vehicle, wherein the visible component is a cover (14, 14', 14'', 14''') or a grille element or a light guide of the air vent.

12. The interior component as claimed in claim 1, wherein the interior component is an air vent of a vehicle, wherein the functional component is an air-guiding slat (16, 16', 16'', 16''') of the air vent.

13. The interior component as claimed in claim 12, wherein the air-guiding element has opposite bearing pins by means of which the air-guiding element is pivotably mounted on a housing (10) of the air vent.

14. The interior component as claimed in claim 13, wherein the axle component (26) is arranged concentrically to the bearing pins.

15. The interior component as claimed in claim 13, wherein the axle component (26) is arranged eccentrically to the bearing pins.

16. The interior component as claimed in claim 2, wherein holding means are provided which hold the functional component in at least one pivoted position.

17. The interior component as claimed in claim 16, wherein the holding means comprise latching means and/or friction means which hold the functional component in the at least one pivoted position by latching and/or frictional force.

18. An interior component of a vehicle, comprising:
a visible component facing a vehicle interior when the visible component is in a mounted state, and
a functional component connected to the visible component,
wherein an axle component (26) is provided on which both the visible component and the functional component are mounted,
wherein the functional component is pivotably mounted, wherein the visible component and the functional component are mounted on the axle component (26) in such a way that a pivoting movement of the functional component does not require pivoting movement of the visible component;
wherein holding means are provided which interact with the functional component in multiple pivoted positions of the functional component in order to hold the functional component in any one of the multiple pivoted positions.

19. The interior component as claimed in claim 18, wherein the visible component has at least one hook (28) and at least one counter-bearing (32, 32', 32"), wherein the at least one hook (28) and the at least one counter-bearing (32, 32', 32") are in engagement with the axle component (26) from opposite sides, and wherein the at least one hook (28) and the at least one counter-bearing (32, 32', 32") are offset with respect to one another in an axial direction of the axle component (26).

* * * * *